July 24, 1956   J. B. EISEN ET AL   2,756,173
ELECTRICALLY CONDUCTIVE PLASTIC ARTICLE
Filed Dec. 18, 1952
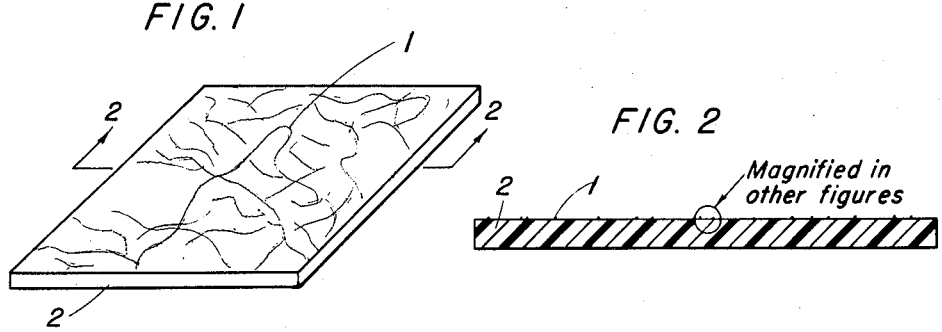
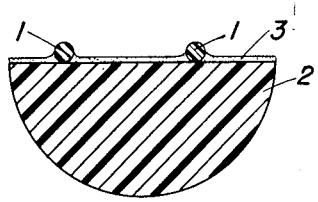
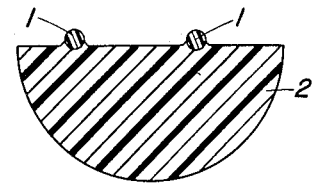
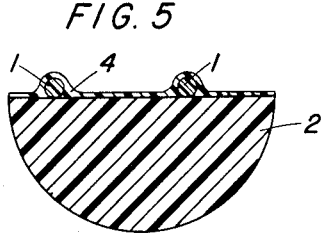
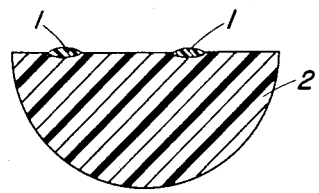
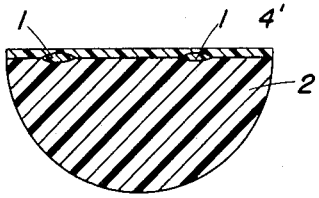
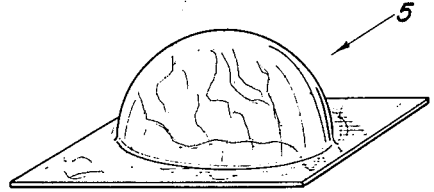
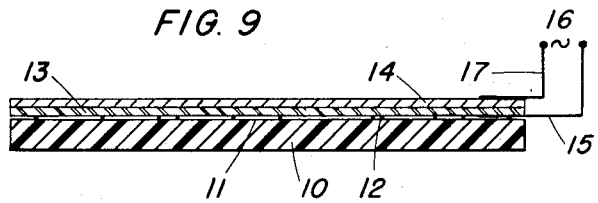
INVENTOR.
JOHN B. EISEN
PETER R. GIRARDOT
ELMER G. PAQUETTE
STANLEY E. ROHOWETZ
BY
Attorney United States Patent Office 2,756,173
Patented July 24, 1956

2,756,173

ELECTRICALLY CONDUCTIVE PLASTIC ARTICLE

John B. Eisen, Waterloo, Peter R. Girardot, Madison, Elmer G. Paquette, Cambridge, and Stanley E. Rohowetz, Madison, Wis., assignors to Bjorksten Research Laboratories, Inc., a corporation of Illinois Application December 18, 1952, Serial No. 326,734

12 Claims. (Cl. 154—93)

This invention relates to plastic articles which are conductive to electricity and more particularly to synthetic resin sheet articles having a surface made conductive to electricity to a precisely limited degree.

Heretofore, it has been difficult to make surfaces conductive to a precisely controlled extent without affecting or modifying the underlying solid materials, and it has been impossible to make surfaces conductive in such manner without destroying the transparency of the material treated.

Problems which have been particularly pertinent in this connection have been the problems of dissipating static charges from transparent surfaces such as aircraft glazing, the problem of shielding fluorescent lights to prevent radio interference without impairing light transmission, and the problem of heating and defogging windshields.

In the past it has been attempted to solve these problems by applying, for example, extremely fine or light metal deposits to the base materials. Where the base material was a plastic, such metal deposits could be made to adhere only with extreme difficulty because of the differential expansion of metals and plastics when undergoing temperature changes and because of the inherently lower adhesion of metals to plastics as compared to adhesion to more polar materials such as glass, under the severe conditions such coatings often encounter. Where transparent metal oxides were employed the same difficulty existed.

Furthermore, if metal was deposited on a base material by any of the known methods, including vapor application in vacuum, chemical deposit, plating, or spraying, then if the thickness of the metal deposit was reduced to the point of transparency, conductivity was of too low an order of magnitude.

In accordance with the present invention we produce very fine fibers of conductive plastic material and then cause a group of said fibers to adhere to a synthetic resin sheet or else laminate a group of said fibers as part of an interlayer in a laminate comprising synthetic resin sheets. The group of fibers may be laid on the surface of a synthetic resin sheet and may be caused to adhere by use of an adhesive between the fibers and the sheet or by use of a coating applied over said fibers. A coating may also be applied over said fibers to protect them from such untoward influences as weathering, high-velocity air, wind-blown sand, hail, snow, rain, sleet and the like, accidental contact therewith by personnel and maintenance devices such as ladders, hoses, tools and the like, or the effects of gasolines, oils, cleaning compositions, corrosive liquids, or the like. The sheet, after having said fibers applied thereto, may suitably be formed into a curved article being generally cylindrical or spheroidal, such as a radar dome, bomber nose, cockpit canopy, or shield for a fluorescent light.

It is therefore an object of the invention to produce a plastic sheet article adapted to transmit electrical current laterally, which may be formed into a sheet curved in one, two or three planes without deleterious effects.

Another object is a plastic sheet article having fine non-metallic fibers on one surface thereof or in the interior thereof adapted to transmit electrical current.

Another object is a method of making a plastic sheet conductive to electricity.

Further objects and advantages will become apparent from the drawings and the following detailed description in which like reference numerals refer to like parts and in which it is my intention to illustrate the applicability of the invention without intending to limit its scope, and in which:

Figure 1 is a perspective view from above of a sheet of conductive synthetic resin according to the invention;

Figure 2 is a cross sectional view taken along lines 2—2 in Figure 1;

Figure 3 is a magnified cross sectional view of that portion of the device encircled in Figure 2;

Figure 4 is a cross sectional view of the portion of the device encircled in Figure 2 showing a modification of the method;

Figure 5 is another cross sectional view of the portion of the device encircled in Figure 2 showing another embodiment;

Figure 6 is a cross sectional view of the portion of the device encircled in Figure 2 showing another embodiment;

Figure 7 is a cross sectional view of a portion of the device encircled in Figure 2 showing another embodiment;

Figure 8 is a perspective view from above showing the application of the invention to a spheroidally curved sheet of synthetic resin;

Figure 9 is a cross sectional view of the device showing a particular application.

In order to prepare the article of the invention a plurality of fine fibers are first produced by blowing, extruding, spinning, draping or air-swinging a solid conductive thermoplastic synthetic resinuous material which may have any one of the following compositions, or an equivalent thereof:

*Compostion 1*

50 parts nylon
7 parts powdered graphite
3 parts acetylene black

*Composition 2*

4 parts polymethyl methacrylate
2 parts polyacrylic rubber
3 parts powdered graphite

*Composition 3*

50 parts polystyrene
7 parts powdered graphite
3 parts acetylene black

*Composition 4*

50 parts polyacrylonitrile
7 parts powdered graphite
3 parts acetylene black

*Composition 5*

25 parts polyacrylonitrile
25 parts polymethyl acrylate
6 parts powdered graphite
3 parts acetylene black

*Composition 6*

5 parts nylon
1.9 parts finely powdered silver

*Composition 7*

10 parts polyvinyl chloride
5 parts finely powdered copper

Composition 8

15 parts copolymer of vinylchloride and vinylidene chloride
3 parts of powdered gold

Composition 9

30 parts copolymerized vinylchloride and vinylidene chloride
6 parts powdered graphite
3 parts acetylene black.

In addition to the compositions shown above suitable fibers can be prepared with several polyester resins, with polyethylene, with polychlorotrifluoro ethylene, with several silicone rubbers, with polyurethane, neoprene and with government synthetic rubbers and with several nitrile rubber latexes. Conductive films have been prepared with tetrafluoroethylene but as yet the best compositions that have been worked out with polytetrafluoroethylene have been barely workable in the invention.

The most desirable fibers have a diameter of between .01 and 50 mils.

The group of the fibers thus produced is applied to the surface of a sheet of synthetic resin and is caused to adhere thereto by any one of several methods. The surface of a sheet of polymethyl methacrylate may be made tacky by applying a solvent such as methylene chloride and the fibers adhere to the tacky surface under very light pressure. The surfaces of other resins may similarly be softened and made tacky by solvent action. Alternatively, a very thin coating of adhesive, as shown by adhesive 3 in Figure 3, may be applied to the surface of the resin sheet 2. As shown in Figures 1, 2 and 3, fibers 1 are thereby caused to adhere to the surface of the sheet of resin 2.

Fibers 1 may be caused to adhere to the sheet of resin 2, as mentioned above and as shown in Figure 4, by making the surface of resin 2 slightly tacky and pressing fibers 1 slightly into the said surface.

Fibers 1 may be caused to adhere to a sheet of synthetic resin such as resin 2, as shown in Figure 5, by applying to resin 2, over the fibers, a layer 4 of transparent synthetic resin which is adherent to resin 2 and which thereby causes said fibers to be retained against said resin at least in part by mechanical means.

As shown in Figure 6, fibers 1 may be pressed into the surface of resin 2 to provide a good bond, whether previously adhered thereto or not. This may be accomplished by placing a sheet of resin 2 between suitably prepared platens and pressing at a pressure of from 20 to 3000 lbs. per square inch at a temperature of between 150° and 550° F.

As shown in Figure 7 an overspray, overcoat, or overlayer may be then coated over the somewhat flattened fibers. As shown in Figure 7 this coating is designated as 4'.

It has not been possible heretofore with any structure of the prior art to provide a conductive surface upon a flat sheet which would remain conductive when the flat sheet was bent into a sharply curved form and particularly when it was bent to form an article curved in three planes, that is, curved more or less speroidally, such as is the case with aircraft cockpit canopies, radar domes, aircraft navigation domes, and the like.

However, the transparent conductive sheet of the present invention, according to Figure 3, Figure 4, Figure 5, Figure 6 or Figure 7, may be bent at forming or laminating temperatures into such dome shaped articles of the type shown as article 5 in Figure 8. This is possible because the conductive fibers 1 are thermoplastic and extensible and when subjected to stretching forces do not break but instead merely elongate, becoming reduced in the lateral dimensions of width and thickness and consequently having a higher resistance. Both the elastic and the thermoplastic properties of the materials from which fibers 1 are made appear to take part in this action.

It will thus be seen that a sheet of synthetic resin made conductive according to the invention may be formed into any desired shape and may, for example, be used as a fighter aircraft cockpit canopy which suitably dissipates static charges which are accumulated on the surface of the canopies of the prior art and have the effect of interfering with radio reception. Sheets of transparent synthetic resin, made conductive upon one surface by the method of our invention, may be used either in the flat form or in any desired bent form, as windshields or other transparent members in which it is desired to provide internal heating means for dissipating sleet, ice, snow and the like which may form thereon, by passing a current thru the conductive fibers. Such application has been found suitable both for aircraft and for automobiles. The conductivity of the surface may easily be controlled to very sharp limits by controlling the size of the fibers and the number of fibers applied per unit of resin surface.

Since in most cases, the conductive fibers are themselves opaque, the transparent conductive synthetic resin article of the invention has the appearance of being provided on at least one side thereof with an irregular pattern of fine opaque lines. The interruption to vision and the reduction of light transmitted have both been found to be negligible. To minimize interruption to vision, a dull or "flat" black color has been found preferable for the fibers.

Referring now to Figure 9 there is shown another application of the invention wherein a sheet of transparent synthetic resin 10 having its surface 11 made conductive by fibers 12, is disposed adjacent a layer of material 13 which is adapted to become luminescent when electrons pass therethrough. Disposed on the opposite side of the layer of material 13 is a thin sheet of conductive metal which may suitably be copper or aluminum foil 14. Conductive fibers 12 are connected with a suitable conductor 15 to one side of a source 16 of either A. C. or D. C. electricity and layer 14 connected by a suitable conductor 17 to the other side thereof. Electrons passing from fibers 12 to layer 14 or vice versa, through layer 13, cause the material of layer 13 to luminesce and light is thus transmitted outwardly through transparent synthetic resin 10. More light is produced and transmitted in those areas relatively closest to said fibers and thus a pleasing random pattern of light is provided by the device. Our invention makes it possible to provide a device of the type shown in Figure 9 which is curved in any desired shape or form. It may even suitably be used for making intricately curved objects, such as articles of transparent synthetic resin having the shape of sculptured articles of art, serve as sources of light.

In addition to the materials shown above in the specific compositions as being suitable for finally divided conductive materials mixed with thermoplastic synthetic resin to form the conductive fibers according to the invention, the following elements and equivalents thereof may be utilized to form sols or suspensions from which the conductive fibers according to the invention may be prepared:

| | |
|---|---|
| Platinum | Osmium |
| Iridium | Palladium |
| Titanium | Rhodium |
| Ruthenium | Mercury |

The following examples further illustrate the invention with greater particularity.

Example 1

Suitable fibers were made with the ingredients of Composition 2, set forth above; in the following manner:

Four parts polymethyl methacrylate were added to 2 parts of polyacrylic rubber and 3 parts of powdered graphite. These ingredients were stirred slightly with a stirring rod in 120 parts of a solvent consisting of 90% acetone and 10% chloromethane. The solution was stirred with a stirrer which subjected the solution to a high degree of shear. Stirring was continued for 10 minutes. A time such as 5 minutes is suitable and the time may be as long as 30 minutes without deleterious effects. Stirring was conducted at room temperature. The proportion of solids in the solvent is not critical, both higher and lower proportions of solute such as a concentration as low as 10% and as high as 70% may suitably be used and a higher proportion of solute may be used if higher temperature is utilized. The preferable percentage range for operating at room temperature is from about 15 to about 30%.

The above solution, after being subjected to a certain amount of evaporation during the stirring operation, was pumped out of a small orifice with a high pressure gear-type pump. The stream of solution thus emerging into air from the orifice quickly dried by evaporation of solvent and the resulting fiber was wound onto a bobbin. The diameter of the fiber thus produced depended to a considerable degree on the viscosity of the solution pumped through the orifice and generally ranged from 5 mils to about 50 mils.

The diameter of the thicker fibers thus produced was reduced by drawing the fiber immediately upon emergence from the orifice by a high velocity substantially annular blast of air directed at the fiber from orifices situated in a circle substantially surrounding the fiber extruding orifice and oriented in such manner as to blow the fiber away from the orifice. Of course any other suitable gas may be used in place of air. Fibers as small as 1 mil in diameter were produced by this method. Fibers of diameter this small were produced only in short sections corresponding to a long staple fiber, but of course with equipment perfected to a greater degree continuous fibers of this diameter or smaller diameter may be produced.

It was found that the fibers prepared in this manner had a resistance in the range of from 1 to 6 megohms for a fiber 6 inches long, depending upon the diameter of the fiber and the uniformity of the mixture in the fiber.

A mat of fibers prepared in this manner was caused to adhere to a sheet of polymethyl methacrylate by laying the loose mat or network of fibers on the surface of a sheet of polymethyl methacrylate and then pressing the two between glass plates at a temperature of 250° F. to 350° F. and a pressure of 150 p. s. i. The temperature range from 260° F. to 280° F. was found to be preferable. Preferable pressure was in the range from 125 p. s. i. to 200 p. s. i. although pressures as low as 50 p. s. i. and as high as 500 p. s. i. or even higher could suitably be used.

The resistance from one edge to the other edge of a 6 inch square of a sample of material prepared in this manner was 2 megohms in one direction and 4 megohms in the other, the variance in resistivity being due to the unequal distribution of fibers in the surface of the sample.

The flat sheet having the aforesaid fibers laminated into its surface in the aforesaid manner was formed into a dome having an external radius of approximately 3 inches. It was found that the fibers did not delaminate or become unadhered from the polymethyl methacrylate sheet during the course of this operation, but instead merely elongated, with an accompanying decrease in width and thickness. The forming was carried out at a temperature of approximately 110° C. and temperatures of about 100° C. and temperatures of about 150° C. may suitably be used for forming polymethyl methacrylate in this manner, such formation being a matter of general knowledge to those skilled in the art.

A dome produced in this manner was found to have a resistance of .5 megohm per square inch where the resistance of the flat sheet before being blown was somewhat less. The dome thus produced transmitted 92.5% of incident white light and its haze was 1.5% by method 3021 of Federal Specification L–P–406a.

*Example 2*

To determine whether fibers produced in the manner hereinabove described would lose conductivity upon formation of a curved article out of flat sheet having said fibers adhered to the surface thereof, fibers of various compositions were elongated to determine the point at which resistivity increased to infinity, thus indicating breaks or near breaks in the fibers, that is a failure of the fiber in tension.

A fiber having the composition of Composition 2 prepared in accordance with the method described above in Example 1 was laminated to the surface of a strip of polymethyl methacrylate at a temperature of about 275° F. and a pressure of 150 p. s. i. The maximum elongation for such fibers without losing conductivity was determined by stretching the strip having the fiber laminated thereto at a temperature of 120° C. It was found that fibers could be elongated as much as 168% without loss of conductivity.

The resistance of fibers elongated to this extent was found to be 25 megohms per half inch length of fibers. Fibers which were stretched to a lesser extent had lower resistances, for example a fiber elongated 137% had a resistivity of 10 megohms per half inch, a fiber elongated 22% had a resistance of 1 megohm per half inch, a fiber elongated 81% had a resistance of 9 megohms per half inch and a fiber elongated 0% had a resistance of .3 megohm per half inch. These values are given merely as examples. Resistance varied with slight variations in composition and diameter of fiber and the variation of resistance with elongation was measured for a very great number of fibers.

*Example 3*

Composition 4 is utilized to prepare fibers by dissolving the polyacrylonitrile in a suitable solvent such as dimethyl formamide and then adding the graphite and the acetylene black. This solution is intimately mixed by stirring and the solvent is evaporated. The solution is then preferably poured on to a flat glass plate in order to prepare a cast film by evaporation of the solvent from the mixture. The resultant solid film is then shredded and used as a molding powder in an extruder from which the fiber is spun by hot melt extrusion.

Fibers prepared in this manner may be adhered to the surface of sheets of transparent synthetic resinous material such as polymethyl methacrylate, poly-α-chloro methacrylate and other acrylic resin compositions in the same manner as described above to provide flat sheets of transparent material provided on the surface with the appearance of a network of fine black lines, from which curved articles such as domes, having a conductive surface may be formed.

*Example 4*

The ingredients of Composition 1 are utilized to prepare fibers conductive to electricity in the following manner:

The nylon is dissolved in a large excess of methanol. To this solution are added the graphite and the acetylene black. The solution is thoroughly mixed. The solvent is evaporated to dryness to provide a solid black conductive resinous composition. This may be done in any suitable manner but generally a preferable manner is to pour the solution out on a glass plate or other surface in such manner that it forms a thin film whereupon after evaporation of the solvent a thin layer of the conductive resinous composition is provided. The resistance of a film prepared in this manner was measured by placing a pair of electrodes, each 1 mm. by 1 mm. square spaced ½ inch apart, on the surface of the film at various points. The resistance measured in this manner was .2 to .5 megohm.

Fibers are prepared from such film by slicing into thin strips by means of a knife drawn along a steel rule or else by means of such a device as disclosed in co-pending application Serial No. 256,513, filed November 15, 1951, entitled "Fiber Preparation Method," now abandoned. Fibers prepared in this manner which were .004 inch thick and 3/32 inch wide had a resistance of 500 ohms per half inch length of fiber.

Suitable fibers are prepared from this film also by shredding the film or cutting it into small pieces and introducing these into an extruder wherefrom a fiber is spun by hot melt extrusion.

Such fibers were elongated and the resistance of ½ inch lengths of the elongated fibers was measured. The following results were obtained:

| Elongation— | Resistance, ohms |
| --- | --- |
| 0 | 500 |
| 12.5% | 20,000 |
| 25% | 100,000 |
| 50% | $5 \times 10^5$ |
| 100% | $20 \times 10^6$ |

Fibers prepared in this manner may be caused to adhere to the surface of a sheet of transparent synthetic resin by any one of the methods described above and the sheets thus formed may be blown or molded into curved sheet articles.

*Example 5*

Ingredients of Composition 3 are utilized to prepare fibers conductive to electricity in the following manner:

The polystyrene, in the form of a molding powder, was dissolved in 200 parts of dichloromethane. After being dissolved, the graphite and the acetylene black were added.

The composition was mixed and cast into a film according to the method of Example 4.

Fibers are formed therefrom according to either of the two methods of Example 4. The resistance of such fibers is suitable for the invention at appropriate elongations of the fibers.

It will be understood of course that other solvents for polystyrene such as benzene, toluene, xylene, aliphatic ketones and esters such as ethyl acetate, methyl ethyl ketone, acetone and the like, nitroethane and nitropropane may be used.

The conductivity of the material thus prepared was quite high, for example in the film form the resistance of one film, measured as in Example 4, was 10,000 to 30,000 ohms. Another sample had a resistance of 300 ohms to 1,000 ohms.

*Example 6*

Fibers were prepared in accordance with Composition 6 by dissolving the nylon in methanol and adding to this a solution of silver nitrate in methanol and water. This solution was added in proper proportions to provide 3 grams of silver nitrate, equivalent to 1.9 grams of silver, for each 5 grams of nylon resin present in the solution. The resulting solution was reduced by the addition of a quinone-type photographic developing solution added slowly so as to reduce the silver before the precipitation of the nylon. A cast film of solid conductive resin was prepared as described in Example 4.

It was found that the properties of this film could be improved somewhat by the addition of 1 part of acetylene black in addition to adding the above mentioned silver nitrate.

A film prepared in this manner had an average resistance of about 10 megohms according to the method of Example 4.

*Example 7*

Eight grams of polytrifluorochloroethylene in the form of a powder were mixed with 1 gram of graphite and 1 gram of acetylene black. The material, after being thoroughly mixed, was pressed at 260° C. A brittle film was obtained which had an average resistance of 90 ohms measured according to the method of Example 4. Fibers are then prepared from this film as described above.

The other compositions shown above and the other resins mentioned above are utilized to prepare conductive films and fibers for utilization according to the invention in any one of the several manners described. Although certain specific proportions of conductive material mixed with various thermoplastic synthetic resins are disclosed, it will be understood that these represent merely illustrative compositions and that the compositions which may be suitable for the invention vary widely from the particular compositions set forth above which are merely representative of those proportions which are operable.

Since certain changes may be made in the above described article and method and the several described embodiments thereof without departing from the scope of the invention, it is intended that all matter contained in this specification shall be interpreted as illustrative and shall be limited only by the claims.

Having thus disclosed our invention, we claim:

1. In a transparent synthetic resin article: a surface conductive to electricity; said conductivity being provided by a plurality of fibers adherent to said surface, said fibers comprising a thermoplastic synthetic resin and adapted to undergo elongation without failure and to remain adherent to said transparent synthetic resin under such conditions as said transparent synthetic resin may undergo elongation without failure.

2. The article of claim 1 wherein said fibers have a diameter of between .01 and 50 mils.

3. The article of claim 1 wherein said fibers are adherent to said transparent synthetic resin by reason of an adhesive comprising a synthetic resin interposed thereinbetween.

4. The article of claim 1 wherein said fibers are adhered to said transparent synthetic resin by a coating comprising a synthetic resin which is adherent to said transparent resin and which overlies such fibers thereby retaining said fibers against said surface, at least in part by mechanical means.

5. The article of claim 1 wherein the surface of said fibers presented to the atmosphere is substantially at least nearly coextensive with the surface of said transparent synthetic resin.

6. The article of claim 6 wherein the surface presented by said fibers to the atmosphere is made substantially at least nearly coextensive with that of said transparent synthetic resin and the adherence of said fibers to said synthetic resin is at least increased somewhat by pressing said fibers into said synthetic resin at a temperature of 150° F. to 550° F. and at a pressure of 20 to 3,000 pounds per square inch.

7. The article of claim 1 wherein a transparent coating overlies said fibers and that portion of the surface of said transparent synthetic resin not covered by said fibers.

8. In a transparent synthetic article: a surface conductive to electricity; said conductivity being provided by an irregular network of fibers comprising synthetic resin and adapted to conduct electricity, interposed between the outer surfaces of an article comprising transparent substantially non-conductive synthetic resin, said fibers lying in a plane substantially parallel to at least one of said surfaces.

9. A transparent synthetic resin article which presents the appearance of being provided on at least one surface thereof with an irregular network of fine substantially black lines and being conductive to electricity; said conductivity to electricity being provided by a plurality of substantially dull black fibers comprising synthetic resin adherent to at least one surface thereof and having a diameter of from .01 to 50 mils.

10. The method of making a substantially transparent synthetic resin article which comprises adhering a plurality of fibers conductive to electricity and comprising a thermoplastic synthetic resin to at least one surface of a sheet of transparent synthetic resin.

11. The method of claim 10 wherein the surface presented by said fibers to the atmosphere is made substantially at least nearly coextensive with the surface of said sheet of transparent synthetic resin by laminating said fibers into said synthetic resin.

12. In a transparent synthetic article: a surface conductive to electricity; said conductivity being provided by an irregular network of fibers comprising synthetic resin and adapted to conduct electricity, said fibers lying in a plane substantially parallel to at least one of the surfaces of said article.

References Cited in the file of this patent

UNITED STATES PATENTS

| | | |
|---|---|---|
| 2,135,057 | Slayter et al. | Nov. 1, 1938 |
| 2,476,282 | Castellan | July 19, 1949 |
| 2,487,985 | Ruben | Nov. 15, 1949 |
| 2,522,527 | Manning | Sept. 19, 1950 |

FOREIGN PATENTS

| | | |
|---|---|---|
| 599,617 | Great Britain | Mar. 17, 1948 |